United States Patent
Chai et al.

(10) Patent No.: US 11,874,853 B2
(45) Date of Patent: Jan. 16, 2024

(54) DATA CLASSIFICATION BY ON-THE-FLY INSPECTION OF DATA TRANSACTIONS

(71) Applicant: Satori Cyber Ltd., Rishon Lezion (IL)

(72) Inventors: Eldad Chai, Kfar Saba (IL); Yoav Cohen, Nes-Ziona (IL); Ben Herzberg, Modiin (IL)

(73) Assignee: SATORI CYBER LTD., Rishon Lezion (IL)

(*) Notice: Subject to any disclaimer, the term of this patent is extended or adjusted under 35 U.S.C. 154(b) by 36 days.

(21) Appl. No.: 17/015,111

(22) Filed: Sep. 9, 2020

(65) Prior Publication Data

US 2022/0075801 A1    Mar. 10, 2022

(51) Int. Cl.
  *G06F 16/00* (2019.01)
  *G06F 16/28* (2019.01)
  *G06F 16/23* (2019.01)

(52) U.S. Cl.
  CPC ........ *G06F 16/285* (2019.01); *G06F 16/2379* (2019.01)

(58) Field of Classification Search
  CPC .......................... G06F 16/285; G06F 16/2379
  USPC .................................................. 707/600–899
  See application file for complete search history.

(56) References Cited

U.S. PATENT DOCUMENTS

| | | | |
|---|---|---|---|
| 7,660,807 B2 | 2/2010 | Prahlad et al. | |
| 2012/0215911 A1* | 8/2012 | Raleigh | H04M 15/66 709/224 |
| 2018/0089271 A1* | 3/2018 | Kosuru | G06N 20/00 |
| 2019/0310982 A1 | 10/2019 | Aikoh et al. | |
| 2020/0074106 A1* | 3/2020 | Narayanaswamy | G06F 21/6227 |
| 2021/0117567 A1* | 4/2021 | Braghin | G06F 21/6245 |
| 2021/0117571 A1* | 4/2021 | Prakash | G06F 16/906 |

FOREIGN PATENT DOCUMENTS

WO    2019108821 A1    6/2019

OTHER PUBLICATIONS

Oracle, "History of SQL", Oracle® Database SQL Reference, 10g Release 1 (10.1), Part No. B10759-01, year 1996, downloaded from https://docs.oracle.com/cd/B12037_01/server.101/b10759/intro001.htm.

Dean et al., "MapReduce: Simplified Data Processing on Large Clusters", OSDI'04: Sixth Symposium on Operating System Design and Implementation, San Francisco, CA (2004), pp. 137-150, year 2004 downloaded from https://ai.google/research/pubs/pub62.

Smith, "Americans' experiences with data security", Internet & Technology, Pew Research Center, pp. 1-7, Jan. 26, 2017, downloaded from https://www.pewinternet.org/2017/01/26/1-americans-experiences-with-data-security/.

Satori, "Data Protection and Governance for Data-Driven Organizations", whitepaper, pp. 1-7, Apr. 19, 2020.

Satori, "Protecting Data-Driven Innovation", one pager, p. 1, year 2020.

* cited by examiner

*Primary Examiner* — Irete F Ehichioya
*Assistant Examiner* — Shirley D Hicks
(74) *Attorney, Agent, or Firm* — Kligler & Associates Patent Attorneys Ltd.

(57) ABSTRACT

A data classification system includes a proxy and a processor. The proxy is configured to intercept transactions that are conducted over a network between clients and a data store. The processor is configured to construct, based on the intercepted transactions, a classification map including a classification of at least some of the data that is stored in the data store into predefined classes.

17 Claims, 2 Drawing Sheets

DATA CLASSIFICATION BY ON-THE-FLY INSPECTION OF DATA TRANSACTIONS

FIELD OF THE INVENTION

The present invention relates generally to data governance, and particularly to methods and systems for data classification by inspection of data transactions.

BACKGROUND OF THE INVENTION

Many organizations collect, process and store large volumes of data in various types of data stores. Some organization data may be stored on-premises, whereas other data may be exported to public cloud vendors; the data may change over time, and some data may be fully or partially duplicated and stored at different locations. Visibility and management of organization data under such circumstances are extremely challenging.

SUMMARY OF THE INVENTION

An embodiment that is described herein provides a data classification system including a proxy and a processor. The proxy is configured to intercept transactions that are conducted over a network between clients and a data store. The processor is configured to construct, based on the intercepted transactions, a classification map including a classification of at least some of the data that is stored in the data store into predefined classes.

In some embodiments, the processor is configured to construct the classification map without directly accessing the data store. In some embodiments, at least one of the predefined classes includes a class of sensitive data.

In an embodiment, the processor is configured to indicate in the classification map, at least for the data classified into one of the classes, respective locations of the data in the data store. In another embodiment, at least for given data, the processor is configured to indicate in the classification map an identity of a client accessing the given data.

In a disclosed embodiment, a given transaction includes a query from a client and a response to the query from the data store, and the processor is configured to classify the data pertaining to the given transaction based on both the query and the response. In another embodiment, a given transaction includes a query from a client and a response to the query from the data store, and the processor is configured to classify the data pertaining to the given transaction based on only one of the query and the response.

In an example embodiment, the processor is configured to output a report that reports the classification map. Additionally or alternatively, the processor may be configured to enforce a policy on subsequent transactions based on the classification map. In an embodiment, the proxy is configured to suspend a given transaction until the processor has completed classifying the data pertaining to the given transaction.

There is additionally provided, in accordance with an embodiment of the present invention, a data classification method including intercepting transactions that are conducted over a network between clients and a data store. A classification map, which includes a classification of at least some of the data that is stored in the data store into predefined classes, is constructed based on the intercepted transactions.

The present invention will be more fully understood from the following detailed description of the embodiments thereof, taken together with the drawings in which:

DETAILED DESCRIPTION OF EMBODIMENTS

Overview

Figure 1:
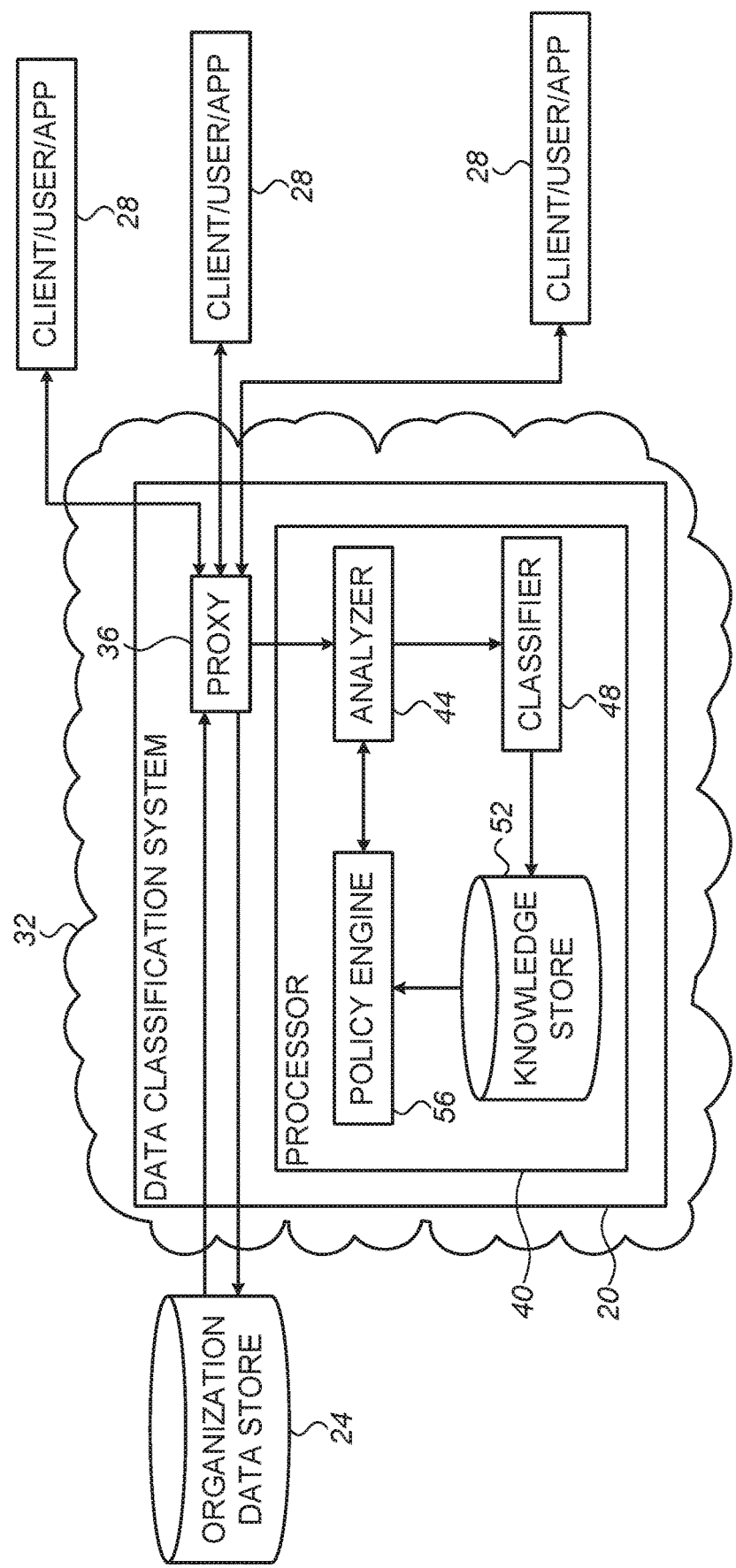
FIG. 1 is a block diagram that schematically illustrates a data classification system, in accordance with an embodiment of the present invention.

Management of data in an organization is highly challenging, for a number of reasons. In many practical cases the data is stored across multiple platforms, which may utilize different "big data" storage technologies. Data may be dispersed geographically, across multiple service providers and/or locally. Data may be collected and processed by different teams in the organization, e.g., engineering, marketing or HR. Data may be fully or partially duplicated, e.g., due to migration between technologies or between service providers, due to backup or data enrichment, and/or due to usage of data by different teams, clients or suppliers. Moreover, data may change over time, e.g., added, modified, become obsolete and possibly deleted. Last but not least, the sheer size of the data in many organizations makes visibility and management a challenge.

One example aspect of data management is the tracking of sensitive data, e.g., personal information, financial data, business-sensitive data, or any other data specified as sensitive. It is important for an organization to have a clear and comprehensive picture of its sensitive data, e.g., where sensitive data is located, where it is being sent and/or who accesses it. It is often desirable to break down and customize this information by the type of sensitive data, e.g., separately for employee personal information and for customers' payment-card data.

It may be possible in principle to classify and track an organization's sensitive data by scanning the relevant data store, either manually or in an automated manner. Such a solution, however, is infeasible or uneconomical in many cases, e.g., due to the size and variability of the data and the computational resources required.

Embodiments of the present invention that are described herein provide improved methods and systems for data classification and tracking. Rather than scanning the data on the data store, the disclosed techniques are based on inspecting data transactions that are conducted between clients and the data store.

In the present context, the term "data store" refers to the aggregation of data storage resources used by the organization, which may comprise, for example, one or more databases, data warehouses and/or data lakes, whether collocated or dispersed, on-premises and/or off-premises, and managed internally and/or by a third-party supplier such as a public-cloud vendor. The term "clients" refers broadly to any entity that interacts with the data store, including human users external or internal to the organization, software applications that access the data store, and the like. The term "transaction" refers to any access to the data store, e.g., for reading or for writing data. Typically, a transaction comprises a query from a client and a corresponding response from the data store. In this context, an Application Programming Interface (API) call is also considered a type of query.

In some embodiments of the present invention, a data classification system comprises a proxy and a processor. In example embodiments, although not necessarily, the processor comprises an analyzer, a classifier, a classification knowledge store and a policy engine. The analyzer, the classifier and the policy engine may be implemented, for example, as suitable software modules. The knowledge store, also referred to herein as a "classification map" may be implemented using a suitable data structure stored in memory.

Typically, clients conduct transactions with the data store over a network, e.g., over the Internet or in a virtual private cloud. The proxy is configured to intercept the transactions and to offload the transactions to the processor, possibly after applying some preprocessing. The processor is configured to construct, based on the intercepted transactions, a classification map comprising a classification of at least some of the data that is stored in the data store into predefined classes.

In an example embodiment, the classification map lists the various data items that were classified as sensitive, and their respective storage locations. Additionally or alternatively, the classification map may comprises any other suitable classes and/or additional information.

In various embodiments, the classification system may use the classification map in different ways. For example, the system may export a report that lists the organization's sensitive data items and their storage locations. As another example, the system may formulate and/or enforce a policy, e.g., a security policy, based on the classification map.

The technique of classifying data by inspecting data transactions with a data store, as opposed to scanning the data store itself, has significant advantages. For example, the disclosed classification system is only loosely-coupled to the data store, and has no need for close integration with it. As such, it is relatively straightforward to deploy the classification system with an existing data store, regardless of its structure or size and without modification. The disclosed solution is non-disruptive, in the sense that it does not interfere with on-going transactions or with the internal workings of the data store. Moreover, the disclosed solution has a built-in preference for classifying commonly-accessed ("hot") data, and therefore does not waste resources on classifying stale or rarely-accessed ("cold") data.

System Description

FIG. 1 is a block diagram that schematically illustrates a data classification system 20, in accordance with an embodiment of the present invention. System 20 classifies data that is stored in a data store 24, by intercepting and analyzing data transactions conducted between clients 28 and data store 24 over a network 32.

In various embodiments, data store 24 may comprise, for example, one or more databases, one or more data warehouses, one or more data lakes, and/or any other suitable data storage resources, as well as combinations of such resources. Data store 24 may be collocated or dispersed, on-premises and/or off-premises, and may be managed internally and/or by a third-party supplier such as a public-cloud vendor.

Clients 28 may comprise, for example, human users such as employees, customers or suppliers, and/or software applications that access data store 24. Network 32 may comprise, for example, a Wide-Area Network (WAN) such as the Internet, a Local-Area Network (LAN) of the organization, or any other suitable network or combination of networks.

In the embodiment of FIG. 1, system 20 comprises a proxy 36 and a processor 40. Processor 40 comprises an analyzer 44, a classifier 48, a knowledge base 52 (also referred to as a classification map), and a policy engine 56. Proxy 36 is configured to intercept data transactions conducted between clients 28 and data store 24, and to forward the intercepted transactions to processor 36. Processor 40 is configured to construct and update knowledge store 52, i.e., the classification map, based on the intercepted transactions, using methods that are explained further below.

The configurations of system 20 and its components, e.g., the internal configuration of processor 40, as shown in FIG. 1, are example configurations that are depicted purely for the sake of conceptual clarity. In alternative embodiments, any other suitable configurations can be used. For example, processor 40 may have any other suitable internal structure and partitioning. As another example, proxy 36 need not necessarily be collocated with processor 40.

The various elements of system 20, e.g., proxy 36 and processor 40, may be implemented using any suitable hardware, such as in one or more computers, one or more Application-Specific Integrated Circuit (ASICs) and/or one or more Field-Programmable Gate Arrays (FPGAs), using suitable software, or using a combination of hardware and software elements. Knowledge store 52 may be implemented using any suitable solid-state or magnetic memory or storage medium.

In some embodiments, some or all of the functions of processor 40, and possibly some functions of proxy 36, may be implemented using a programmable processor that is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Data Classification by Interception of Data Transactions

Figure 2:
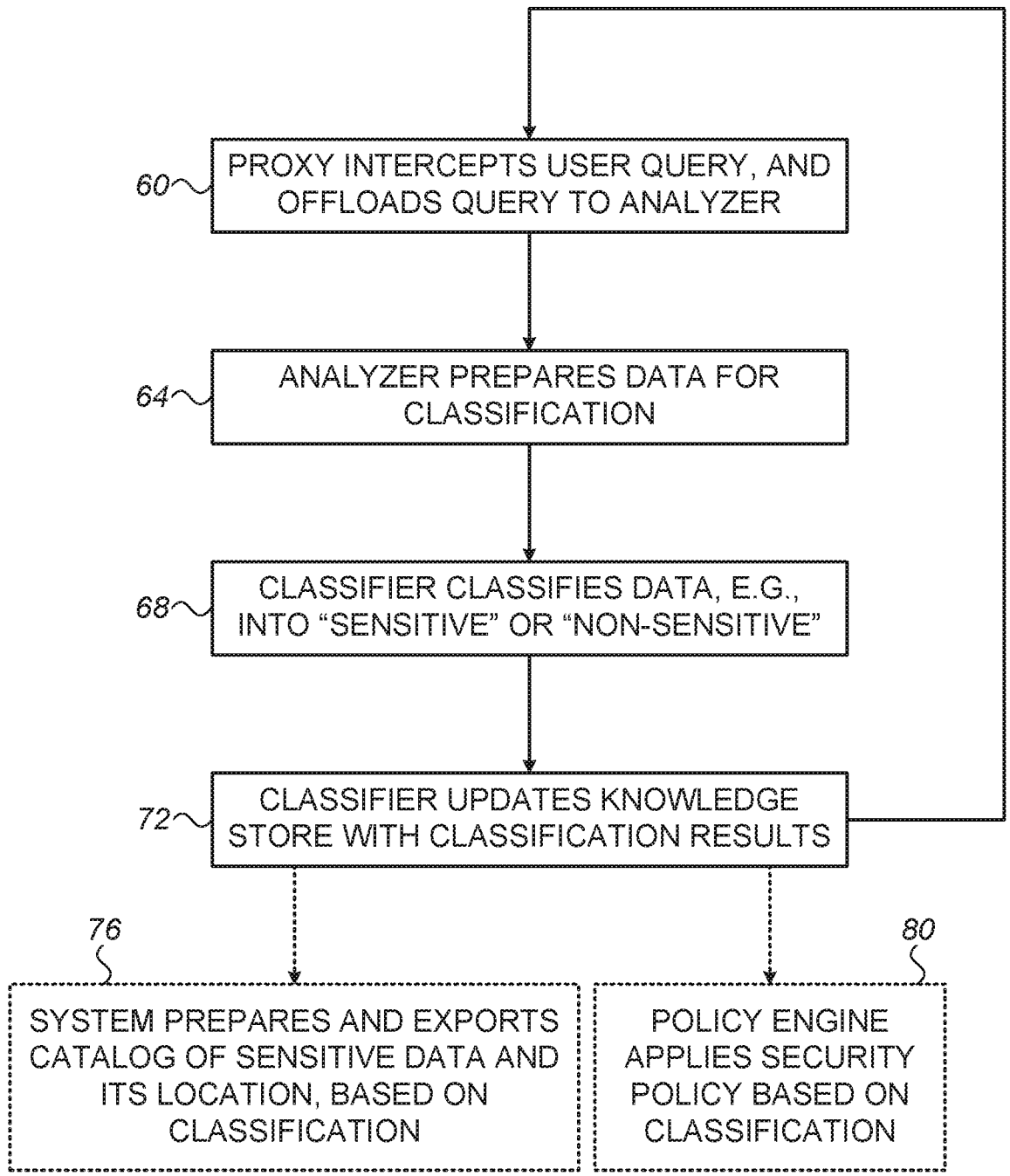
FIG. 2 is a flow chart that schematically illustrates a method for data classification, in accordance with an embodiment of the present invention.

FIG. 2 is a flow chart that schematically illustrates a method for data classification, carried out by system 20, in accordance with an embodiment of the present invention. The method begins with proxy 36 intercepting a data transaction conducted between a client 28 and data store 24, and offloading the transaction to analyzer 44, at an interception step 60.

A given transaction typically comprises a query from a client (e.g., read or write request), and a response to the query from the data store (e.g., the requested data or an acknowledgement of the write). In some embodiments proxy 36 intercepts and forwards both the query and the response to processor 40. In other embodiments proxy 36 intercepts and forwards only the query, or only the response. For example, proxy 36 may forward only the part of the transaction that contains actual data (e.g., the query in case of a write, and the response in case of a read). For example, in some cases, e.g., in asynchronous query jobs, proxy 36 may be able to intercept only a certain direction of the transaction.

In some embodiments, the interception of transactions is asynchronous, i.e., proxy 36 allows the intercepted transaction to proceed regardless of the classification. In other embodiments, the interception is synchronous, in which case proxy 36 does not permit the transaction to proceed (e.g., prevents data from reaching the data store) until a suitable policy is applied. In yet other embodiments, a hybrid solution is used, in which some transactions are intercepted synchronously and other transactions are intercepted asynchronously.

At a preparation step 64, analyzer 44 prepares the data conveyed by the transaction for classification, and forwards the data, typically along with relevant metadata, to classifier 48.

Typically, proxy 36 is a lean component that has minimal functionality of passing data, since in some embodiments it is placed in-line between clients 28 and data store 24. Analyzer 44 typically parses the queries and responses, and models the data (e.g., recognizes which data is accessed by the queries, the type of filtering the queries perform, etc.). This "division of labor" between the proxy and the analyzer minimizes the latency added to the transactions by the proxy, while the analyzer is offloaded with the traffic.

At a classification step 68, classifier 48 classifies the data of the transaction. As noted above, classifier 48 may classify the data based on the query, the response, or both. In an example embodiment, classifier 48 classifies the data as "sensitive" or "non-sensitive". Additionally or alternatively, any other suitable classification can be applied.

In various embodiments, classifier 48 may use various techniques for classifying data as "sensitive" or "non-sensitive". For example, classifier 48 may perform string analysis on the query, attempting to identify strings that are indicative of sensitive data (e.g., a query that accesses a column named 'phone_number' or 'creditcard_number').

As another example, classifier 48 may perform string analysis on the labels of the data returned in response to the query, attempting to identify strings that are indicative of sensitive data (e.g., data that is returned with a label 'phone_number'). As yet another example, classifier 48 may perform string analysis on the returned data itself, e.g., using regular expressions or other string analysis techniques, attempting to identify values or patterns that are indicative of sensitive data.

Additionally or alternatively, classifier 48 may apply statistical machine learning models to the query and/or to the response. For example, after gathering a sufficient amount of data known to be sensitive, classifier 48 may train a model to find similar samples in queries and/or responses. When performing statistical analysis of this sort, the classification will typically involve sampling data for efficiency and improving the accuracy of the statistical algorithms.

At an updating step 72, classifier 48 updates the classification map (knowledge store 52) with the classification results. In addition to the classification of the data, classifier 48 may update the classification map with metadata such as the storage location of the data in data store 24, e.g., a Uniform Resource Locator (URL).

Other metadata that may be added to the classification map may comprise, for example, the identity of the client accessing the data. The identity may comprise, for example, an Internet Protocol (IP) address of the client, which may be indicative of whether the client is internal or external to the organization, and provide some information as to the client's geographic location. Additionally or alternatively, classifier 48 may obtain identity information by communicating with an identity provider (IDP). Identity information provided by the IDP may indicate the organizational affiliation of the client, e.g., whether the client belongs to the legal, marketing, or HR team.

In various embodiments, classifier 48 may store any relevant metadata about the data in the classification map as part of the classification process. The metadata may be aligned to the schema of the data storage in data store 24. The metadata may indicate, for example, the locations of sensitive data (e.g., that column A of table B contains Personally Identifiable Information (PII) of type C). In some embodiments the metadata can subsequently be reinforced or corrected by a human operator. For example, the operator may specify additional sensitive locations obtained by passive scanning, or mark some element as a false positive.

In some embodiments, metadata may be added only to data that is classified as "sensitive", and not to data classified as "non-sensitive". The method then loops back to step 60 above, in which proxy 36 intercepts another transaction.

The method flow of FIG. 2 is an example flow, which is chosen purely by way of example. In alternative embodiments, any other suitable flow can be used. For example, before classifying certain data, classifier 48 may check whether this data already exists in knowledge store 52. If the data exists, the classifier may refrain from classifying it again.

System 20 may use the classification map in various ways. For example, at an exporting step 76, processor 40 may generate and output a report that lists the organization's sensitive data items and their respective storage locations. As another example, at a policy enforcement step 80, policy engine 56 may formulate and/or enforce a policy, e.g., a security policy, based on the classification map. Any suitable policy can be specified and/or enforced, e.g., a security policy ensuring that no support engineer is exposed to payment card information, a security policy ensuring that no PII is accessed from IP addresses external to the organization, or a security policy alerting on any employee accessing more than a specified number of PII records per day, to name just a few non-limiting examples.

Although the embodiments described herein mainly address management of sensitive information, the methods and systems described herein can also be used in other applications, such as in operational analysis. For example, if classifier 48 finds that a certain type of data is requested frequently from a data warehouse, usage may be optimized by moving the data elsewhere. As another example, the disclosed classification techniques can be used for masking data to render it anonymized and therefore non-sensitive.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A data classification system for classifying data of a data store based on inspecting data transactions between clients and the data store, comprising:

a proxy, configured to intercept transactions that are conducted over a network between clients and the data store, wherein the transactions include queries and responses, and wherein the queries or responses carry data; and a processor, configured to construct, based on the intercepted transactions, a classification map comprising a classification of at least some of the data that is stored in the data store into predefined classes, wherein the classification map lists memory locations of data in the data store along with a corresponding classification of the sensitivity of the data, wherein the processor comprises:
   a knowledge store including the classification map; and
   a classifier which classifies the data as to whether it is sensitive and updates the classification map based on the results of the classification, wherein the classifier is configured to check for intercepted transactions whether their data already appears in the classification map, and to refrain from classifying data of transactions for which the data is already in the classification map.

2. The system according to claim 1, wherein the processor is configured to construct the classification map without directly accessing the data store.

3. The system according to claim 1, wherein the processor is configured to output a report that reports the classification map.

4. The system according to claim 1, wherein the processor is configured to formulate a policy on subsequent transactions based on the classification map.

5. The system according to claim 1, wherein the proxy is configured to suspend a given transaction until the processor has completed classifying the data pertaining to the given transaction.

6. A data classification method for classifying data of a data store based on inspecting data transactions between clients and the data store, comprising:
   intercepting transactions that are conducted over a network between clients and the data store, wherein the transactions include queries and responses, and wherein the queries or responses carry data;
   constructing, based on the intercepted transactions, a classification map comprising a classification of at least some of the data that is stored in the data store into predefined classes, wherein the classification map lists memory locations of data in the data store along with a corresponding classification of the sensitivity of the data,
   wherein constructing the classification map comprises:
      checking for intercepted transactions whether their data already appears in the classification map,
      classifying the data that does not already appear in the classification map as to whether it is sensitive, while refraining from classifying data of transactions for which the data is already in the classification map.

7. The method according to claim 6, wherein constructing the classification map is performed without directly accessing the data store.

8. The method according to claim 6, further comprising outputting a report that reports the classification map.

9. The method according to claim 6, further comprising enforcing a policy on subsequent transactions based on the classification map.

10. The method according to claim 6, further comprising suspending a given transaction until classification of the data pertaining to the given transaction is completed.

11. The method according to claim 6, wherein the intercepted transactions are allowed to proceed regardless of their classification.

12. The system according to claim 1, wherein the proxy is configured to allow intercepted transactions to proceed regardless of their classification.

13. The system according to claim 1, wherein the processor further includes an analyzer which parses the intercepted transactions and models the parsed intercepted transactions to recognize which data is accessed by the intercepted transactions and determine a type of filtering that the intercepted transactions perform.

14. The system according to claim 1, wherein the classifier performs string analysis on the queries to identify strings indicative of sensitive data.

15. The system according to claim 1, wherein the classifier performs string analysis on the data to identify strings indicative of sensitive data.

16. The system according to claim 1, wherein the classifier performs string analysis on the labels of the data to identify strings indicative of sensitive data.

17. The system according to claim 1, wherein the classifier applies a statistical machine learning model to the queries and responses.

* * * * *